United States Patent [19]

Crowther et al.

[11] Patent Number: 4,749,544

[45] Date of Patent: Jun. 7, 1988

[54] THIN WALLED CHANNEL

[75] Inventors: Russell L. Crowther, Saratoga; Eric B. Johansson, San Jose, both of Calif.

[73] Assignee: General Electric Company, San Jose, Calif.

[21] Appl. No.: 29,509

[22] Filed: Mar. 24, 1987

[51] Int. Cl.$^4$ ............................................. G21C 3/34
[52] U.S. Cl. ................................... 376/443; 376/439; 376/444; 376/448; 376/434
[58] Field of Search ............... 376/443, 439, 444, 448, 376/434

[56] References Cited

U.S. PATENT DOCUMENTS 3,697,376  10/1972  Mefford et al. ...................... 376/434
3,715,274   2/1973  Venier et al. ....................... 376/434

FOREIGN PATENT DOCUMENTS 2102617   2/1983  United Kingdom ................ 376/448

*Primary Examiner*—Donald P. Walsh
*Attorney, Agent, or Firm*—Robert R. Schroeder

[57] ABSTRACT

In a channel contained fuel bundle for a boiling water nuclear reactor, an improved channel is disclosed. The channel contains a plurality of fuel rods held in spaced apart relation by at least upper and lower tie-plates and/or spacers. In the reactor, the channel contains fuel rods extending between a lower support plate and an upper support grid. When the reactor is operating, the channel confines water flow intimately about the rod bundle on the inside and assures steam generation in a predictable pattern. Water exterior of the channel is at a different and typically lower pressure. To accommodate control blades (which control the fission process) outside of the fuel bundles, the channel is provided with a polygon cross section, most typically a square cross section. In operation, the flat walls tend to bulge due to primarily pressure effects but also due to thermal and radiation effects. An improved channel is disclosed utilizing a lesser volume of metal which includes corrugated sides providing reinforcement of the side walls against bulge. The corrugations can protrude toward either the inside or the outside of the channel. An embodiment including thick corner sections is disclosed. These thick corner sections provide fixed supports for thin sides and at the same time improved beam resistance to seismic loading.

11 Claims, 4 Drawing Sheets

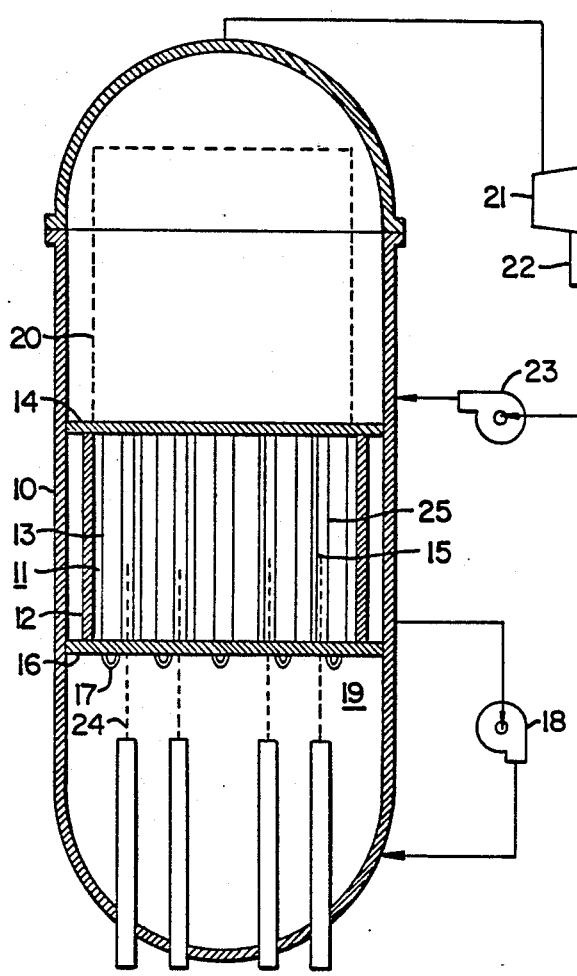
FIG._1.
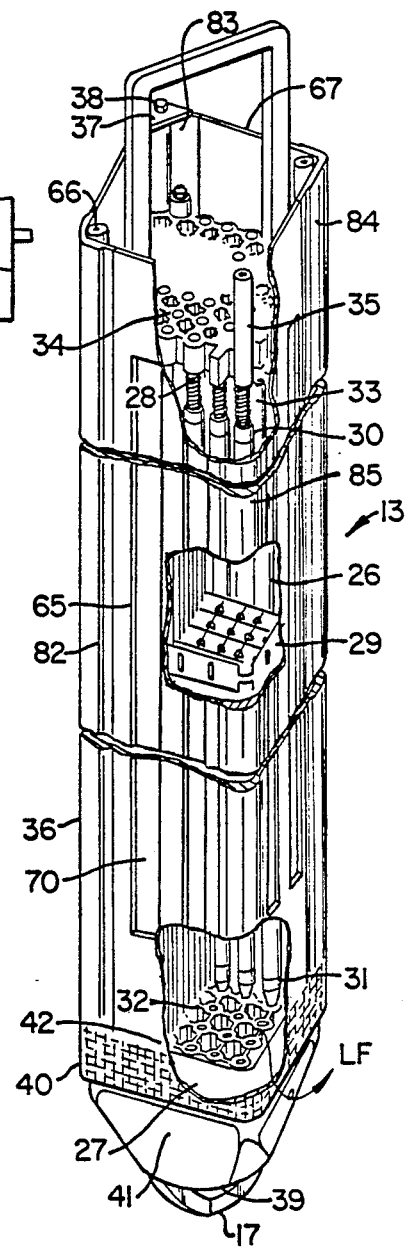
FIG._2.

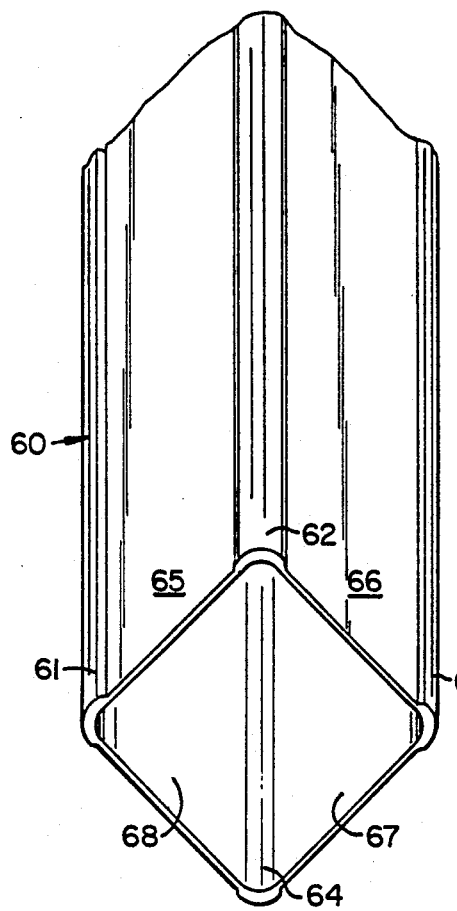
FIG._3.
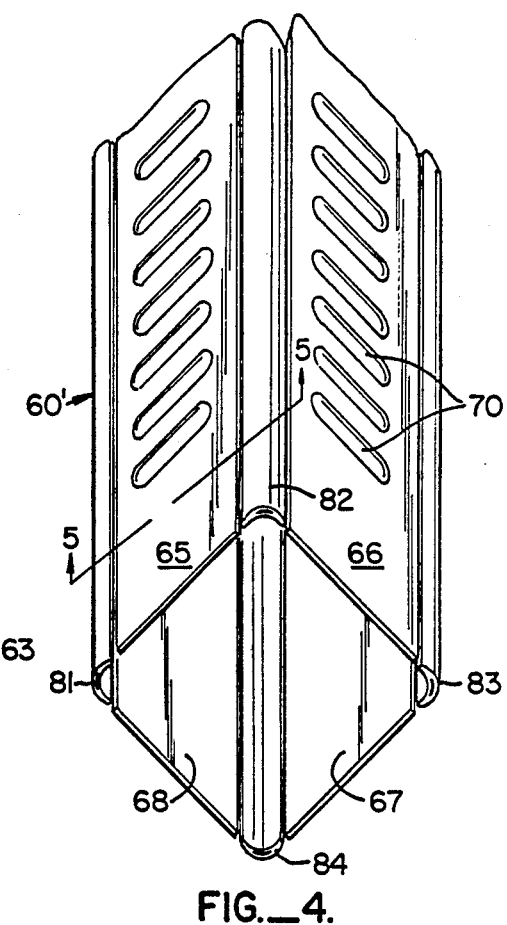
FIG._4.
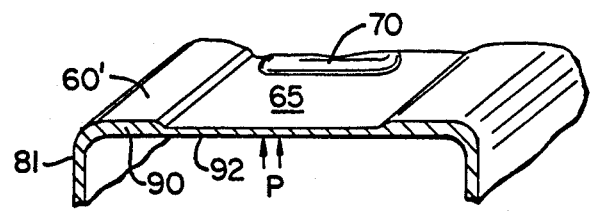
FIG._5.

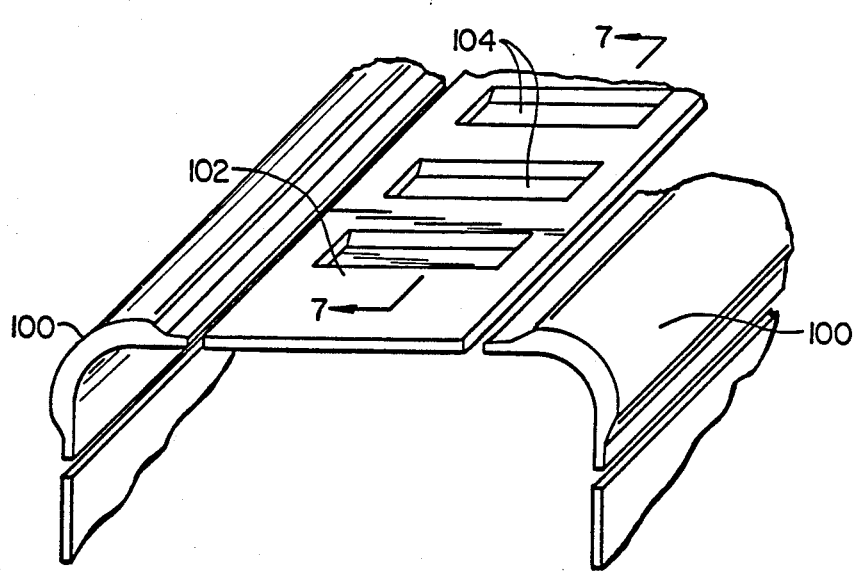
FIG._6.
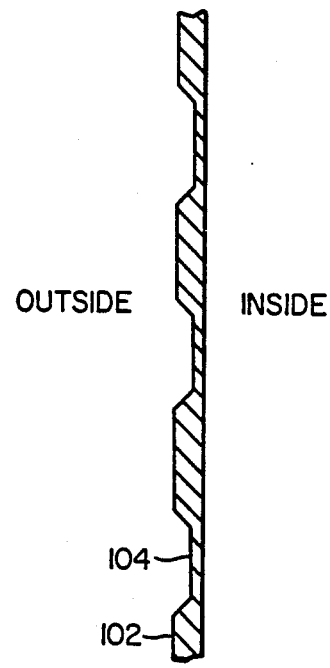
OUTSIDE    INSIDE
FIG._7.

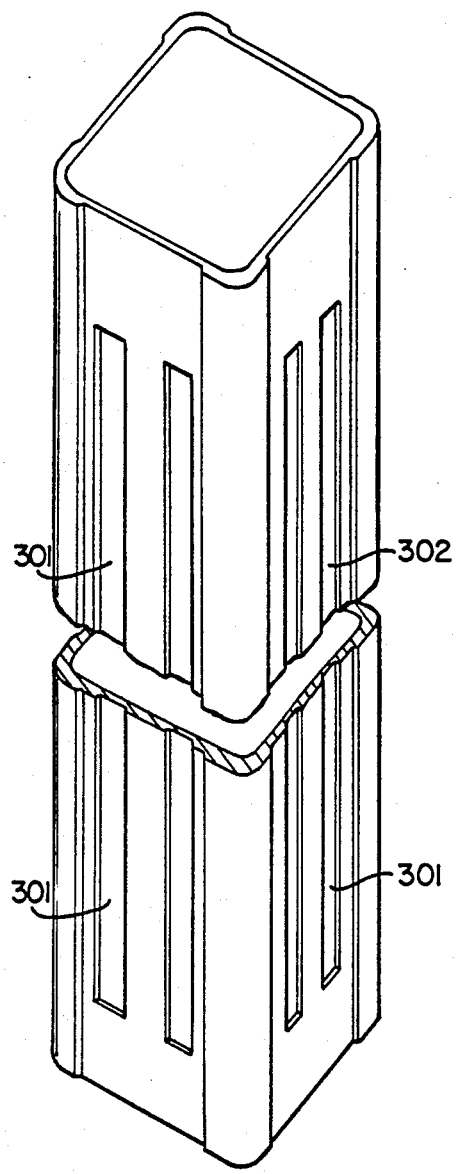
FIG._8.
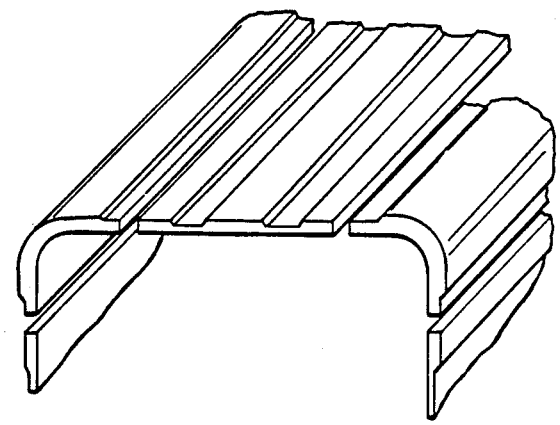
FIG._9.

THIN WALLED CHANNEL

This invention relates to nuclear reactors and more particularly to an improved channel enclosing a fuel bundle.

An embodiment which includes sides with transverse grooves is also disclosed. In this embodiment the sides are slightly thicker than the corrugated material (but thinner than the corner material). Transverse grooves are cut to reduce the volume of material in the channel. The full thickness portions of the side plates, between grooves, provide the required plate stiffness. There results a channel having a reduced volume of neutron absorbing metal which appreciably reduces fuel enrichment or increases the cycle length between refuelings.

An embodiment which includes sides with longitudinal grooves is also disclosed. Longitudinal grooves are cut to reduce the volume of material in the channel. The material is removed from regions where stresses are low, so that the effect on the stiffness of the sides is small. There results a channel having a reduced volume of neutron absorbing metal which appreciably reduces fuel enrichment or increases the cycle length between refuelings.

SUMMARY OF THE PRIOR ART

A boiling water reactor when charged with a fuel load has fissionable materials placed therein capable of releasing a finite number of neutrons. It is known in the prior art to avoid parasitic neutron absorption.

Simply stated, neutrons are released from fission at high speed, moderated by the water to a low speed where the neutrons can produce a chain reaction of fission events. The metal channels used within such reactors parasitically absorb neutrons.

Reactor control occurs typically outside the exterior of such channels. In order to have optimum nuclear reactor control, the channels are formed with flat sides. These flat sides conform to the shapes of the control rods.

The channels also have a purpose of confining water to a predictable flow path around steam generating rods. Steam is generated in the interior of such channels.

Unfortunately, and to assure predictable water flow in the reactor, there is a pressure differential between the inside and the outside of the channels.

Regarding the inside of the channel, the channel communicates to a water supply chamber through a support plate, a nose piece, and lower tie-plate. The channel extends from the nose piece and lower tie-plate upwardly to and toward an upper core grid. Water flows inside the channel about fuel rods and generates steam.

The outside of the channel constitutes a different pressure environment. Typically, water is diverted at the bottom of the channel to the interstices between the respective channels. This water is at a lower pressure.

The planar channel walls are connected by corners and tend to bulge responsive to pressure differential. This tendency to bulge is additionally aggravated by thermal effects and also by radiation.

To minimize parasitic absorption, such channels are typically fabricated from a metal alloy known as Zircaloy and are heat treated to avoid corrosion and distortion in the reactor environment. Zircaloy is an alloy of Zirconium with small amounts of iron, tin and other alloy metals.

In the prior art, such channels have been constructed of a uniform thickness and have been provided with sufficient metal to withstand the pressure differentials. Said channels are fabricated by bending two sheet sections in U-shaped halves and welding the two halves together.

Reinforcement of such channels is known. However, reinforcement has been confined to that portion of the channel adjacent the nose piece and the lower tie-plate for the fuel rods in the channel. Reinforcement of the channels has heretofore not been associated with the need for less neutron absorption and less displacement of neutron moderator. For example, see Venier et al. U.S. Pat. No. 3,715,274 and Mefford et al. U.S. Pat. No. 3,697,376.

SUMMARY OF THE INVENTION

In a channel contained fuel bundle for a boiling water nuclear reactor, an improved channel is disclosed. The channel contains a plurality of fuel rods held in spaced apart relation by at least upper and lower tie-plates and/or spacers. In the reactor, the channel contains fuel rods extending between a lower support plate and an upper support grid. When the reactor is operating, the channel confines water flow intimately about the rod bundle on the inside and assures steam generation in a predictable pattern. Water exterior of the channel is at a different and typically lower pressure. To accommodate control blades (which control the fission process) outside of the fuel bundles, the channel is provided with a polygon cross section, most typically a square cross section. In operation, the flat walls tend to bulge due to primarily pressure effects but also due to thermal and radiation effects. An improved channel is disclosed utilizing a lesser volume of metal which includes corrugated sides providing reinforcement of the side walls against bulge. An embodiment including thick corner sections is disclosed. These thick corner sections provide fixed supports for thin sides and at the same time improved beam resistance to seismic loading.

An embodiment which includes sides with transverse grooves is also disclosed. In this embodiment the sides are slightly thicker than the corrugated material (but thinner than the corner material). Transverse grooves are cut to reduce the volume of material in the channel. The full thickness portions of the side plates, between grooves, provide the required plate stiffness.

An embodiment with longitudinal grooves in the sides is also disclosed. Thick corners and thin sides are used, and two longitudinal grooves are cut in each side to reduce the volume of Zircaloy in the channel. These grooves are symmetrically disposed about the mid-span of each side, where the bending moment is small or zero, so that they have a very small effect on the stiffness of the sides.

Each of the embodiments provides a channel having a reduced volume of neutron absorbing material, which appreciably reduces the uranium enrichment requirements. This channel also displaces less water moderator in the reactor core, improves the moderator-to-fuel ratio, improves the reactor transient and stability performance, and further reduces enrichment requirements.

OTHER OBJECTS AND ADVANTAGES

It is an object of this invention to disclose a fuel channel shape which is addressed to the end of minimizing the volume of metal and increasing the amount of water in a reactor core. Accordingly, a channel is disclosed having thick corners and sides with reduced Zircaloy volume. In one embodiment the sides are thin plates. In other embodiments the sides are modified to provide a more efficient structure.

A further object of the invention is to disclose a channel which is fabricated by welding sheet sections to bent corner sections. The advantage of this fabrication method is that the sheet sections can be of different thickness and properties than the corner sections.

An advantage of the wall construction is that the thin side walls disposed between the thick corners have the same strength as prior art channel walls. However, the amount of metal is reduced. Consequently, parasitic neutron absorption is reduced and the moderator-to-fuel ratio is increased.

The thin sides may be in one of four forms: flat plates, thin plates with corrugations, or thin plates with transverse grooves or thin plates with longitudinal grooves.

An advantage of the disclosed construction is that the thick corners provide fixed supports for the thin sides, providing improved resistance to bending responsive to pressure.

An additional advantage is that when the thin side walls are corrugated, or grooved, the support of the thin plates from the thick corner sections provides an optimally strong channel which minimizes the volume of metal in the reactor.

An overall advantage of the disclosure is that since the volume of metal is reduced in the reactor, parasitic neutron absorption by channels in the reactor is held to a minimum. In addition, the volume of water is increased, resulting in more efficient utilization of fuel. For example, in a reactor having 700 fuel bundles, a one percent increase in fuel cycle length or a corresponding reduction in fuel enrichment resulting from use of channels constructed in accordance with this invention more than justifies any complication of fabrication produced by this design.

An additional advantage of this channel is that the increased water volume provides a greater cold shut down reactivity margin for the reactor.

Yet another object of this invention is to disclose a channel which can be manufactured by standard production techniques. According to this aspect of the invention, the side walls (typically four in the case of a square channel) are worked to produce the desired corrugations or the side walls are machined to provide grooves. The corner walls are bent to produce desired angulation (90° in the case of a square section channel). Thereafter corner walls and side walls are joined by longitudinal welds and worked by conventional techniques into a unitary channel.

A further advantage of the channel is that the depth of the reinforcing corrugations required does not extend to a level where interference with either placement or operation of the steam generating rods occurs.

An advantage of the embodiments including grooves is that the grooves can be configured either on the outside or the inside of the channel. In the outside disposition, they do not interfere with fluid flow interior of the channel. Further, the exterior grooves do not interfere with the removal or replacement of fuel rods and their associated spacers. On the inside the grooves can be used to reduce pressure drop.

Other objects, features and advantages of this invention will be more apparent after referring to the following specification and attached drawings in which:

FIG. 1 is a schematic diagram of a boiling water nuclear reactor illustrating the improved channel members of this invention resting on a lower support plate receiving water from a coolant supply chamber and discharging steam to a separator dryer arrangement through an upper support grid;

FIG. 2 is an illustration of a channel shown here of square cross section with the preferred embodiment including thick corners, thin sides with longitudinal grooves machined in the thin sides;

FIG. 3 is a perspective of a channel having thin sides only, the channel here shown immediately before welding to emphasize the difference in side wall and corner section thickness;

FIG. 4 is a perspective of a channel including both corrugations in the thin side walls and thickened corner sections, the channel here shown immediately before welding to emphasize the difference in side wall and corner section thickness;

FIG. 5 is a section along lines 5—5 of FIG. 4 illustrating a channel wall;

FIG. 6 is a perspective of a channel containing thickened corner sections, and moderately thin side walls with transverse grooves, the channel shown immediately before welding; and, FIG. 7 is a section taken along lines 7—7 of FIG. 6.

FIG. 8 shows a perspective of a channel containing thickened corner sections, and moderately thin side walls with longitudinal grooves. FIG. 9 is a view of a portion of channel with longitudinal grooves, shown before welding.

GENERAL DESCRIPTION

The following general description of a reactor is taken from Venier et al. U.S. Pat. No. 3,715,274 and is applicable to this disclosure.

The invention is described herein in connection with a water cooled and moderated nuclear reactor, an example of which is illustrated in FIG. 1. Such a reactor system includes a pressure vessel 10 containing a nuclear chain reaction core 11 submersed in a coolant such as light water. The core 11 is surrounded by an annular shroud 12. The core 11 includes a plurality of replaceable fuel assemblies 13 arranged in spaced relation and supported in the vessel 10 between an upper core grid 14 and a lower core support plate 16. Each fuel assembly includes a nose piece 17 which engages a support socket in the support plate 16. The end of the nose piece projects through the support plate 16 and is formed with openings or communication with a coolant supply chamber 19. A circulation pump 18 pressurizes the coolant in the supply chamber 19 from which the coolant is forced through the openings in the nose pieces 17 upward through the fuel assemblies. A part of the coolant is thereby converted to steam which passes through a separator-dryer arrangement 20 to a utilization device such as a turbine 21. Condensate formed in a condenser 22 is returned as feedwater to the vessel 10 by a pump 23. A plurality of control rods 24 are selectively insertable about the fuel assemblies 13 for control of the reactivity of the core. A plurality of instrumentation receptacles 15 are positioned among the fuel assemblies to contain neutron detectors for monitoring the power level of the core.

Illustrated in FIG. 2 is a fuel assembly 13 comprising a plurality of elongated fuel rods 26 supported between a lower tie-plate 27 and a skeletonized upper tie-plate 28. The fuel rods 26 pass through a plurality of fuel rod spacers 29 which provide intermediate support to retain the elongated rods in spaced relation and restrain them from lateral vibration.

Each of the fuel rods 26 comprises an elongated tube containing the fissionable fuel, in the form of pellets, particles, powder or the like, sealed in the tube by upper and lower end plugs 30 and 31. Lower end plugs 31 are formed with a taper for registration and support in support cavities 32 which are formed in the lower tie-plate 27. Upper end plugs 30 are formed with extensions 33 which register with support cavities 34 in the upper the plate 28.

Several of the support cavities 32 (for example, selected ones of the edge or peripheral cavities) in the lower tie-plate 27 are formed with threads to receive fuel rods having threaded lower end plugs 31. The extensions 33 of the upper end plugs 30 of these same fuel rods are elongated to pass through the cavities in upper tie-plate 28 and are formed with threads to receive internally threaded retaining nuts 35. In this manner, the upper and lower tie-plates and the fuel rods are formed into a unitary structure.

The fuel assembly 13 further includes a thin-walled tubular flow channel 36, of substantially square cross section, adapted to provide a sliding fit over the lower and upper tie-plates 27 and 28 and the spacers 29 so that it readily may be mounted and removed. The channel 36 has a tab 37 welded to the top end which provides for fastening the channel to the fuel bundle with a bolt 38.

The lower tie-plate 27 is formed with a nose piece 41 adapted, as mentioned hereinbefore, to support the fuel assembly in a socket in the support plate 16 (FIG. 1). The end of the nose piece is formed with openings 39 to receive the pressurized coolant so that it flows upward among the fuel rods.

To avoid stagnation and boiling of the coolant in the water spaces 25 (FIG. 1) between the fuel assemblies, a portion (in the order of 5–6 percent) of the coolant flow into each fuel assembly is allowed to leak into the adjacent spaces 25 from between the lower tie-plate 27 and the channel 36 of the fuel assembly as indicated by the arrow legended LF in FIG. 2 to provide bypass flow among the channels.

This ends the general description taken from Venier et al. U.S. Pat. No. 3,715,274.

It is known to control the leakage flow LF by having a flow channel 36 which can be stiffened at the lower portion 40. This stiffening occurs in the region of the tie-plate and the lower support plate 16 of the reactor (See FIG. 1).

The problem solved by this invention is created by fluid flow inside the channels in the reactor and fluid flow outside the channel in the reactor. Simply stated, water is confined by the channels from the lower support plate 16 and nose piece 41 to the upper support grid 14 for the predictable generation of steam. Steam is generated interior of the channels, and flow of the steam-water mixture upward through the channel causes a pressure drop from the bottom of the channel to the top of the channel.

Exterior of the channel members, the reactor is configured for low pressure water at 25. It is into this area that instrumentation 15 and most importantly the control rods 24 must be placed to control the nuclear reactions. In order to provide efficient fission, proper instrumentation and optimum moderation, the side walls of the channels are made flat to optimally define the interstices between adjacent channels.

The interstices between the channels has low pressure fluid. Thus, there is a tendency of the flat channel walls is to bulge to and towards the interstitial volume. The pressure drop across the channel and the tendency to bulge is greater at the bottom than at the top of the channel. Heretofore, the channels have been constructed of material thick enough to prevent channel bulging to the point where control rod insertion is not interfered with.

Having set forth the reactor environment and the problems relating to channel bulging, the invention can now be described.

First, and with reference to FIG. 3, a channel embodiment with thick corners and thin sides will be shown.

Second, a channel embodiment with corrugated sides and thick corners will be shown. This is illustrated in FIG. 4.

Third, an embodiment with thick corners and with transverse grooves in thin sides will be shown. This is illustrated in FIG. 6.

Fourth, an embodiment with thick corners and with longitudinal grooves in thin sides will be shown. This is illustrated in FIGS. 8 and 9. The grooves can be deeper in the upper part of the channel. This embodiment is preferred.

Referring to FIG. 3, a channel section is illustrated in perspective having thick corners and thin sides. Typically, the channel section 60 includes four corner pieces 61, 62, 63, 64. The channel section includes thin wall sections 65, 66, 67 and 68. As can be seen these thin wall sections are attached between the respective corner by conventional techniques. Here, for example, all channel portions are constructed of the alloy Zircaloy.

FIG. 4 shows a channel stiffened by forming corrugations in the channel wall. The corrugations begin about 6" from the bottom of the channel. The lower end remains flat so that the fit between the channel and the lower tie-plate is not affected. The corrugations can be inward, outward or alternately inward and outward.

The corrugations are limited to a region near the middle of each flat channel side for two reasons. First, the corrugations are most effective in increasing the channel bending stiffness in this region. Extending the corrugations further towards the channel corners has negligible effect on the bending stiffness. Secondly, the corrugations would interfere with external and internal structures if extended to the corners.

The corrugations are aligned perpendicular to the bundle axis. They increase the moment of inertia of the channel faces about axes parallel to the bundle axis.

The effect of the corrugations can be illustrated by considering a reference flat channel face of thickness $t_o$. If the material thickness is reduced, the moment of inertia can be held constant by forming corrugations in which the distance between the top and bottom surfaces of the corrugations (h) is greater than $t_o$. The moment of inertia of the corrugated plate can be made twice that of the reference plate if $h \approx 1.6 t_o$.

Calculations of the deflection of the corrugated plate have been performed using a finite element computer code. It was found that corrugations extending over less than one half of the plate width and having a total height h equal to 1.8 times the plate thickness will reduce the deflection by a factor of two. Studies of BWR channel and bundle designs have shown that a substantial reduction in channel material thickness can be made using corrugated channels.

Attention will now be directed to FIG. 4 and the detail of FIG. 5. These respective figures will be used to illustrate how the respective disclosed corrugated side walls can co-act with an embodiment of the channel member having thickened corners.

Referring to FIG. 4 a channel 60' is shown. As before, the channel has side walls 65, 66, 67, and 68 with corrugations 70 configured therein. The channel has thickened corner sections 81, 82, 83 and 84.

Corner sections 81–84 are thickened because the maximum bending moment exerted by pressure exists at the corner. Therefore, the face deflection of the respective side panel member 65–68 is sensitive to the corner material thickness. Preferably, corner sections are 1.4 to 1.8 times as thick as the side sections 65–68.

There is an additional advantage of the thickened corner section which may not immediately be apparent. Specifically, all reactors have to be designed to withstand seismic loading. Such seismic loading can constitute a translation of the entire reactor. Therefore, it is necessary to provide the discrete channels (which can number in the range of 700 for a typical reactor) with beam bending resistance. That is to say, each channel must be a beam of sufficient rigidity to withstand predicted dynamic forces caused by translation of the entire reactor vessel transverse to the axis of the channels.

Simply stated, the corner members being thickened as herein disclosed provide an increased moment of inertia to the section of the channel. In providing this increased moment of inertia, the beam type bending properties of the channels are improved.

It can be also illustrated with FIG. 5 that the thickened corner sections provide the spanning wall member with increased rigidity.

Referring to FIG. 5, it can be seen that corner member 81 is attached in the vicinity of 90 to plate 65. This attachment in effect provides a fixed support 92 from the corner section 90 for plate 65. This support provides improved resistance to the loading of pressure P on the inside of the channel 60' to and towards the outside of the channel 60'. In other words, the support of the plate at the thickened corner section provides an enhanced pressure resistance.

It is believed apparent from FIGS. 2 and 4 that the channel lends itself to standard production techniques.

Regarding such production techniques, the metal corners will be conventionally bent. Walls 65–68 will be conventionally joined as by welding at the respective seams. Working of the produced channel to ensure straightness can occur as shown in the prior art.

Secondly, it will be seen that the respective corrugation 70 do not interfere with the fuel bundle. Specifically, panels 65–68 have their respective corrugations so as not to interfere with either the tie-plates, rods, or control blades.

Referring to FIGS. 6 and 7, a channel construction is illustrated in which thick corners 100 have thin sides 102 supported therebetween. It will be appreciated that the embodiment of FIG. 6 is shown immediately before welding.

Thin sides 102 are differently fabricated than heretofore disclosed. Specifically, the thin sides 102 have a series of transverse grooves 104 milled therein. This milling constitutes a thinning of the side wall sections. Referring to FIG. 7 a section can be seen of the side walls with the walls 102 shown at the thin transverse grooves 104.

The reader will appreciate that each transverse groove 104 at its thin section is completely surrounded by an effective "frame" of thickened side wall material 102. This thickened material 102 in effect supports the thinned diaphragm 104 of material. Thus, resistance to pressure deformation is provided with a minimum amount of material present.

It has been found that this design has the same overall amount of material and stiffness as the corrugated side wall design heretofore shown. However, the reader will appreciate that the inside is absolutely smooth. Therefore, there will be no appreciable interruptions in flow along the side wall channels. Furthermore, there will be no irregularities on the inside surface which can cause mechanical fouling as where refueled rods are inserted within the reactor.

FIGS. 8 and 9 show views of an embodiment having thick corners, thin sides, and longitudinal grooves 301 in the sides. This is the preferred embodiment. The longitudinal grooves remove material from regions where the bending moment and stress are the lowest. In these regions a substantial amount of material can be removed with very small increase in channel wall deflection under pressure loading. In one alternate embodiment, the longitudinal grooves are located in the inside of the channel to reduce channel pressure drop and improve coupled nuclear-thermal-hydraulic stability. In a further alternate embodiment, the longitudinal grooves are on the outside of the channel at the bottom and on the inside of the channel at the top to provide pressure drop improvement at the top of the interior of the channel where the two phase pressure drop due to steam voids is greatest. The fabrication technique of welding flat sheet sections to bent corner sections makes it feasible to incorporate many different embodiments in different combinations, distributed axially, so as to optimize the reactor performance characteristics.

The fabrication technique of welding sheet sections to bent corner sections makes it feasible to incorporate any of the preceding embodiments, in any combination distributed axially, to tailor the reactor performance characteristics so as to achieve variable objectives.

What is claimed is:

1. A fuel assembly comprising a plurality of fuel rods positioned in a spaced array by upper and lower tie-plates, an open ended flow channel surrounding said array for conducting coolant upward about said fuel rods, said open ended channel having a polygon shaped cross section with flat side sections connected between said corner sections; means separate from said channel connecting said upper and lower tie-plates together and maintaining said fuel rods in spaced array independent of said flow channel, improvement in said flow channel comprising:
    four corners having a first thickness;
    four sides having a second and reduced thickness from said corner thickness, said sides welded to said corner sections.

2. The invention according to claim 1 in which the channel is fabricated from welding side sheet sections to bent corner sections.

3. The invention of claim 1 wherein said thin sides are corrugated to provide additional stiffening to resist pressures from the inside of said channel to and toward the outside of said channel.

4. The invention of claim 1 wherein the sides have transverse grooves.

5. The invention of claim 1 wherein each side has two or more longitudinal grooves.

6. A fuel assembly comprising a plurality of fuel rods positioned in a spaced array by upper and lower tie-plates, an open ended flow channel surrounding said array for conducting coolant upward about said fuel rods, said open ended channel having a polygon shaped cross section with flat side sections connected between corner sections; with other means connecting said upper and lower tie-plates together and maintaining said fuel rods in spaced array independent of said flow channel, the improvement in said flow channel comprising:
   four corners having a first thickness;
   four sides having a second and reduced thickness from said corner section;
   said sides defining corrugations formed therein extending at least partially the span of said flat side sections for reinforcing said flat sections to resist pressures from the inside of said channel to and toward the outside of said channel.

7. A fuel assembly comprising a plurality of fuel rods positioned in spaced array by upper and lower tie-plates, an open ended flow channel surrounding said array for conducting coolant upward about said fuel rod, said open ended channel having a polygon shaped cross section with flat side sections connected between corner sections; with other means connecting said upper and lower tie-plates together and maintaining said fuel rods in spaced array independent of said flow channel, the improvement in said flow channel comprising:
   four corners having a first thickness; and,
   four sides having a second and reduced thickness from said corner section, said sides fastened to said corner section to provide support of said side sections in the vicinity of said corner sections;
   each said side defining transverse grooves on the exterior of said channels.

8. The apparatus of claim 7 and wherein said transverse grooves extend only partially the width of said sides.

9. A fuel assembly comprising a fuel assembly comprising a plurality of fuel rods positioned in a spaced array by upper and lower tie-plates, an open ended flow channel surrounding said array for conducting coolant upward about said fuel rods, said open ended channel having a polygon shaped cross section with flat side sections connected between said corner sections; means separate from said channel connecting said upper and lower tie-plates together and maintaining said fuel rods in spaced array independent of said flow channel improvement in said flow channel comprising:
   four corners having a first thickness;
   four sides having a second and reduced thickness from said corner section, said sides welded to said corner sections to provide support to said sides; each said side having longitudinal grooves on the external surface of the channel.

10. A fuel assembly comprising a fuel assembly comprising a plurality of fuel rods positioned in a spaced array by upper and lower tie-plates, an open ended flow channel surrounding said array for conducting coolant upward about said fuel rods, said open ended channel having a polygon shaped cross section with flat side sections connected between said corner sections; means separate from said channel connecting said upper and lower tie-plates together and maintaining said fuel rods in spaced array independent of said flow channel improvement in said flow channel comprising:
   four corners having a first thickness;
   four sides having a second and reduced thickness from said corner section, said sides welded to said corner sections to provide support to said sides; each said side having longitudinal grooves on the internal surface of the channel.

11. A fuel assembly comprising a fuel assembly comprising a plurality of fuel rods positioned in a spaced array by upper and lower tie-plates, an open ended flow channel surrounding said array for conducting coolant upward about said fuel rods, said open ended channel having a polygon shaped cross section with flat side sections connected between said corner sections; means separate from said channel connecting said upper and lower tie-plates together and maintaining said fuel rods in spaced array independent of said flow channel improvement in said flow channel comprising:
   four corners having a first thickness;
   four sides having a second and reduced thickness from said corner section, said sides welded to said corner sections to provide support to said sides; each said side having longitudinal grooves on the external surface of the channel in the lower one-half ($\frac{1}{2}$) to three-quarter ($\frac{3}{4}$) of the channel height and longitudinal grooves on the internal surface of the channel in the upper three-quarters ($\frac{3}{4}$) to one-half ($\frac{1}{2}$) of the channel height.

* * * * *